United States Patent [19]

Giles et al.

[11] 4,301,070
[45] Nov. 17, 1981

[54] AZO DYES FROM A 5-AMINOPYRAZOLE BEARING 1 TO 2 SULFATED HYDROXYALKOXYCARBONYL OR N-(HYDROXYALKYL) CARBAMOYL GROUPS ON ITS RING

[75] Inventors: Ralph R. Giles; Max A. Weaver, both of Kingsport, Tenn.

[73] Assignee: Eastman Kodak Company, Rochester, N.Y.

[21] Appl. No.: 100,626

[22] Filed: Dec. 5, 1979

[51] Int. Cl.[3] .................. C09B 29/036; C09B 29/09; C09B 29/32; C09B 29/36
[52] U.S. Cl. ................................ 260/155; 260/152; 260/157; 260/158; 260/162; 260/163; 260/154
[58] Field of Search .............. 260/152, 154, 155, 156, 260/157, 158, 162, 163, 205, 206, 207, 207.1, 186, 187

[56] References Cited

U.S. PATENT DOCUMENTS

| | | | |
|---|---|---|---|
| 2,670,265 | 2/1954 | Heyna et al. | 260/152 X |
| 2,773,863 | 12/1956 | Bolliger | 260/162 |
| 2,790,172 | 4/1957 | Rudner | 260/158 X |
| 3,114,754 | 12/1963 | Lodge et al. | 260/158 X |
| 3,232,927 | 2/1966 | Randall et al. | 260/163 |
| 3,531,459 | 9/1970 | Chiddix et al. | 260/163 |
| 3,957,751 | 5/1976 | Bauer et al. | 260/152 X |
| 3,998,805 | 12/1976 | Koller et al. | 260/152 X |
| 4,119,623 | 10/1978 | Hugl et al. | 260/152 X |

Primary Examiner—Floyd D. Higel
Attorney, Agent, or Firm—Donald W. Spurrell; Daniel B. Reece III

[57] ABSTRACT

This invention relates to azo dyes in which the diazotized amino component bears 1 or 2 sulfated hydroxyalkoxycarbonyl or N-(hydroxyalkyl)carbamoyl groups on its ring. These dyes have excellent dyeing properties on polyamide fibers and also impart color to cellulose acetate fibers and wool.

The dyes correspond to the formula:

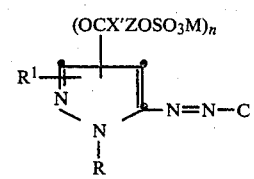

wherein when n is 1, $R^1$ is selected from hydrogen, alkyl, aryl, alkylthio, carbamoyl, alkylcarbamoyl, acyl, cyanoalkyl, and halogen; R is selected from hydrogen, alkyl, aryl, acyl, alkylsulfonyl, arylsulfonyl alkylsulfamoyl, arylsulfamoyl, alkyl substituted with alkoxy, cyano, or halogen, and aryl substituted with alkoxy, halogen, or cyano; X' is O, NH, N(alkyl)—or N(aryl)—; Z is selected from straight- or branched-chain alkylene which may be substituted, for example, with phenyl, halogen, $OSO_3M$, alkoxy, aryloxy and the like; M is H, Na, K or $NH_4$; n is 1 or 2; and the coupler C is selected from a variety of couplers including anilines, tetrahydroquinolines, phenols and the like.

4 Claims, No Drawings

AZO DYES FROM A 5-AMINOPYRAZOLE BEARING 1 TO 2 SULFATED HYDROXYALKOXYCARBONYL OR N-(HYDROXYALKYL) CARBAMOYL GROUPS ON ITS RING

This invention concerns novel dyes in which the diazo moieties contain sulfate groups. These dyes are substantially water soluble and are particularly useful for dyeing polyamide, wool and the like, and exhibit excellent properties including fastness to light and dyeability.

The dyes of this invention correspond to the general formula:

$$\underset{D-N=N-C}{\overset{\overset{O}{\|}}{(C-X'-Z-OSO_3M)_n}}$$

wherein D is a pyrazol-5-yl radical which may be substituted further as defined below; C is the coupler portion of the molecule; X' is O, NH N(alkyl)—, or N(aryl)—; Z is selected from straight- or branched-chain alkylene, which may be substituted, for example, with phenyl, halogen, $OSO_3M$, alkoxy or aryloxy groups, $-CH_2(CH_2)_mV-CH_2(CH_2)_p-$, where m is 1, 2 or 3, p is , 1, 2 or 3, and V is O, S, $SO_2$, $-SO_2NH-$, $-SO_2N(alkyl)-$, $-SO_2N(aryl)$, $-N(SO_2\,aryl)-$, $-NH$, $-NHCO-$, $-NHCONH$, $-N(SO_2\,alkyl)$, or $-CON(alkyl)$; M is H, Na, K or $NH_4$; and n is 1 or 2.

More particularly, the dyes correspond to the formula above wherein D represents the radical

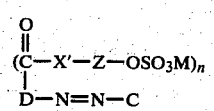

wherein the pyrazol-5-yl ring, in addition to the $$(\overset{\overset{O}{\|}}{C}-X'-Z-OSO_3M)_n$$

group where n is 1, may have a substituent $R^1$ selected from hydrogen, alkyl, aryl, alkylthio, carbamoyl, alkylcarbamoyl, acyl, cyanoalkyl, and halogen; R is selected from hydrogen, alkyl, aryl, acyl, alkylsulfonyl, arylsulfonyl, alkylsulfamoyl, arylsulfamoyl, alkyl substituted with alkoxy, cyano, or halogen, and aryl substituted with alkoxy, halogen, or cyano; and the coupler C is selected from

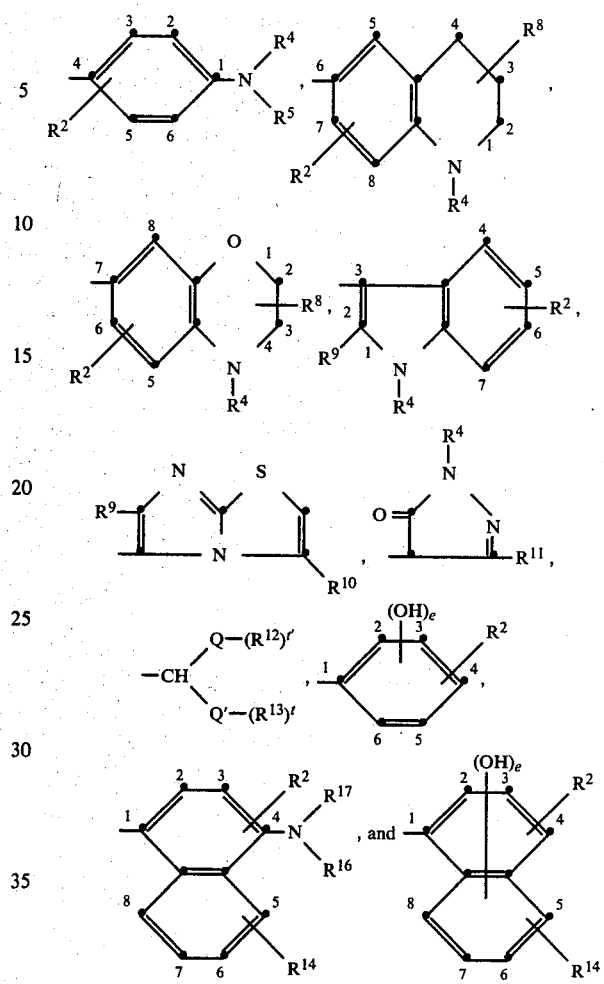

wherein $R^2$ and $R^{14}$ each represents up to three groups selected from hydrogen, fluorine, chlorine, bromine, alkyl, cycloalkyl, alkoxy, phenoxy, alkylthio, arylthio, and radicals having the formula $-NH-X-R^3$ in which X is $-CO-$, $-COO-$, or $-SO_2-$ and $R^3$ is selected from alkyl and alkyl substituted with halogen hydroxy, phenoxy, aryl, cyano, cycloalkyl, alkylsulfonyl, alkylthio, alkanoyloxy, and alkoxy, and when X is $-CO-$, $R^3$ also is selected from hydrogen, amino, alkylamino, alkylcarbamoyl, dialkylamino, arylamino, aryl, and furyl;

$R^4$ and $R^5$ are each selected from hydrogen, alkyl, aryl, cycloalkyl, and $R^4$ and $R^5$ together represent a single, combined group $-CH_2CH_2CH_2CH_2CH_2-$, $-CH_2CH_2OCH_2CH_2-$, $-CH_2CH_2-S-CH_2CH_2-$, and $-CH_2CH_2-SO_2-CH_2CH_2-$;

$R^8$ is one or two groups each selected from hydrogen, alkyl and alkyl substituted with $-CN$, alkoxy, alkoxycarbonyl, alkoxycarbonyloxy, phenyl, cyclohexoxy, $-OH$, $-Cl$ and $Br$;

$R^9$, $R^{10}$ and $R^{11}$ are each selected from hydrogen, alkyl, phenyl, or phenyl substituted with 1–3 groups selected from Cl, Br, alkyl or alkoxy, alkylthio, benzylthio, cyclohexylthio, phenylthio and substituted phenylthio;

Q and Q' are each selected from —CO—, —SO₂—, or —CN; $R^{12}$ and $R^{13}$ are each selected from hydrogen, alkyl, hydroxyalkyl, alkoxy, alkoxycarbonylamino, trifluoromethyl, phenyl or phenyl substituted with 1-3 groups selected from Cl, Br, alkyl or alkoxy, alkoxycarbonylalkyl, cyanoalkyl, amino, haloalkyl, alkylamino, alkylthio, benzylthio, cyclohexylthio, phenylthio and substituted phenylthio; $R^{12}$ and $R^{13}$ may combine to form an alkylene bridge of 2 or 3 carbons, or to form an arylene or cycloalkylene radical of 5-6 carbons connecting Q and Q'; $R^{16}$ and $R^{17}$ are selected from hydrogen, cycloalkyl, aryl, alkyl, and alkyl substituted with alkoxy, hydroxy, alkoxyalkoxy, hydroxyalkoxy, carbamoyl, sulfamoyl, acylamido or alkenylsulfonyl, and aryl substituted with hydroxyalkyl; e is 1 or 2; and t and t' are each 1 or zero. It is noted that when t or t' is zero, the corresponding Q or Q' group is —CN;

Each of the aliphatic portions of the above alkyl, cycloaliphatic, alkoxy, alkanoyl and the like groups, as well as the aryl and aryloxy groups, may be substituted further with up to three of the following: hydroxy; halogen; cyano; succinimido; glutarimido; phthalimido; 2-pyrrolidono; cyclohexyl; phenyl or phenyl substituted with alkyl, alkoxy, halogen, alkanoylamino, cyano or alkoxycarbonyl; alkanoylamino; sulfamoyl; alkylsulfamoyl; vinylsulfonyl; acrylamido; phthalimidinyl; benzoylsulfonicimidyl; alkylsulfonamido; phenylsulfonamido; alkoxycarbonylamino; alkylcarbamoyloxy; alkoxycarbonyl; alkoxycarbonyloxy;

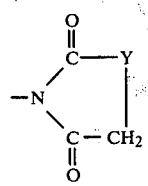

wherein Y is —NH—, —NH-alkyl—, —O—, —S—, or —CH₂O—; —S—$R^6$ wherein $R^6$ is alkyl, phenyl, phenyl substituted with halogen, alkyl, alkoxy, alkanoylamino, cyano, or alkoxycarbonyl, pyridyl, pyrimidinyl, benzoxazolyl, benzimidazolyl, benzothiazolyl, triazolyl, or

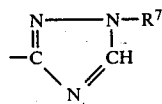

—SO₂$R^3$; —COO$R^3$; —OX$R^3$; —NH—X—$R^3$; —X—$R^3$; —OCO—$R^3$; —CON$R^7R^7$; —SO₂N$R^7R^7$; wherein $R^3$ and X are as defined above and each $R^7$ is selected from H and $R^3$; alkoxy; alkoxy substituted with hydroxy, cyano, alkanoyloxy, or alkoxy; phenoxy or phenoxy substituted with one or more of alkyl, alkoxy or halogen. All of the aliphatic portions of the various groups herein contain from 1-6 carbons, and are straight or branched chain.

The dyes of this invention impart red to blue shades on fibers, particularly polyamides, and are especially useful for dyeing polyamide (nylon) carpets, giving good fastness to light ozone, oxides of nitrogen, washing, sublimation, crocking and the like, and having good leveling, transfer, exhaustion, and build properties.

The couplers used in this invention are prepared according to known procedures. The dyes may be prepared by reacting the coupler with a diazonium salt which contains one or two carbalkoxy groups. The product is reacted first with an aminoalcohol H—X'—Z—OH (X' is NH, Z is alkylene) to convert to a N-(hydroxyalkyl)carbamyl group, or with an alkanediol H—X'—Z—OH (X' is O, Z is alkylene) to convert to a hydroxyalkoxycarbonyl group. Subsequently, the material is reacted with concentrated sulfuric acid to form the sulfate ester:

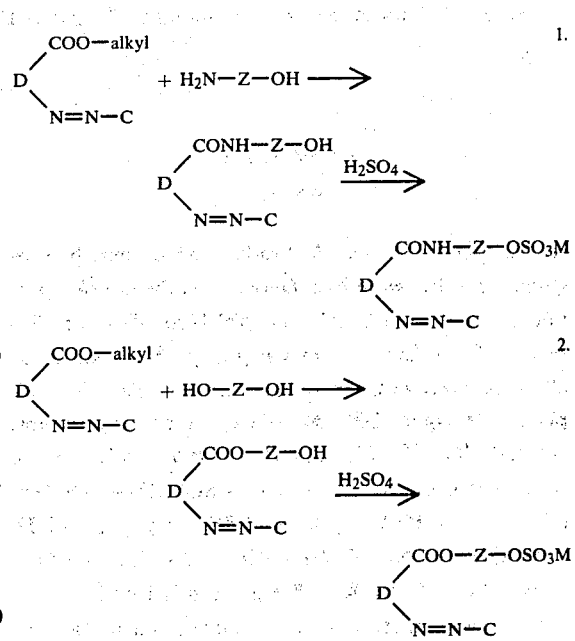

Alternatively, a diazotizable amine containing a hydroxyalkoxycarbonyl group or a N-(hydroxyalkyl)carbamyl group may be sulfated before diazotization and coupling:

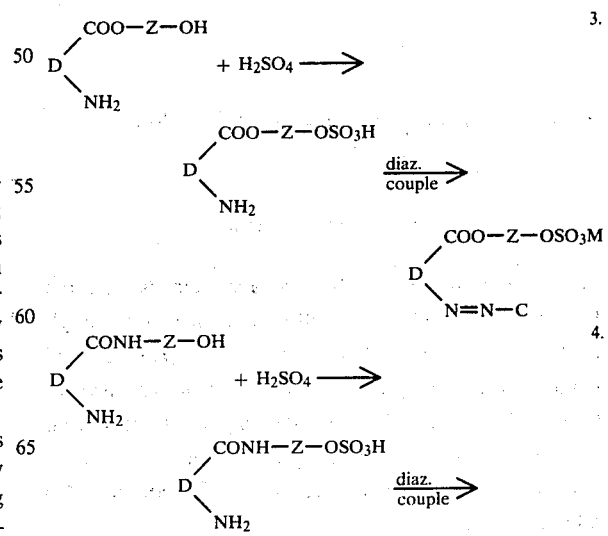

-continued

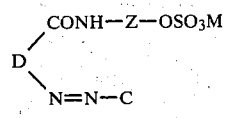

This invention will be further illustrated by the following examples although it will be understood that these examples are included merely for purposes of illustration and are not intended to limit the scope of the invention. The compounds listed in the tables below can be prepared by procedures well known in the art. In these tables, the "Position" column refers to the position of the $$\overset{|}{OCX'ZOSO_3M}$$

group or groups on the pyrazol-5-yl ring.

TABLE 1

(OCX'ZOSO$_3$M)$_n$ — structure with R$^1$, R$^2$, R$^4$, R$^5$, R, N=N linkages

| Position | R | R$^1$ | R$^2$ | R$^4$ | R$^5$ | X'Z | M |
|---|---|---|---|---|---|---|---|
| 3 | H | H | 2-CH$_3$, 5-NHCOCH$_3$ | H | C$_2$H$_5$ | NHC$_2$H$_4$ | Na |
| " | H | 4-CH$_3$ | H | C$_2$H$_5$ | C$_2$H$_4$N(COCH$_3$)$_2$ | N(CH$_3$)C$_2$H$_4$ | " |
| " | H | 4-C$_6$H$_5$ | 3-CH$_3$ | C$_2$H$_4$Cl | C$_2$H$_4$CN | NHC$_2$H$_4$ | K |
| " | CH$_3$ | 4-CH$_3$ | " | " | " | NH—CH$_2$—CH(C$_6$H$_5$) | K |
| " | C$_6$H$_4$—p-Br | H | 3-CH$_3$ | C$_2$H$_4$OH | C$_2$H$_4$OH | OC$_2$H$_4$ | Na |
| " | " | 4-CH$_2$CN | 3-NHCOCH$_3$ | C$_2$H$_5$ | C$_2$H$_4$CN | NHC$_2$H$_4$OC$_2$H$_4$ | Na |
| " | SO$_2$C$_6$H$_5$ | 4-C$_6$H$_5$ | 2-OCH$_3$, 5-NHCOCH$_3$ | C$_2$H$_4$OCOCH$_3$ | C$_2$H$_4$OCOCH$_3$ | NHC$_2$H$_4$ | NH$_4$ |
| 4 | H | 3-CONH$_2$ | 3-Cl | C$_2$H$_4$OH | C$_6$H$_{13}$ | OC$_2$H$_4$ | K |
| " | H | H | 2-Cl | H | C$_2$H$_4$OH | OC$_2$H$_4$ | K |
| " | H | 3-CONH$_2$ | 2-CH$_3$, 3-Cl | H | CH$_2$C$_6$H$_5$ | NHC$_3$H$_6$ | K |
| " | H | H | H | C$_2$H$_4$OH | C$_2$H$_4$CN | OC$_2$H$_4$ | NH$_4$ |
| " | CH$_3$ | H | H | C$_2$H$_4$OSO$_3$K | C$_2$H$_5$ | NHC$_2$H$_4$ | K |
| " | " | 3-CH$_3$ | 3-CH$_3$ | C$_2$H$_5$ | C$_2$H$_4$NHCOCH$_3$ | " | " |
| " | SCN | 3-C$_6$H$_5$ | 3-NHCOCH$_3$ | " | C$_2$H$_4$CONH$_2$ | " | " |
| " | C$_2$H$_4$OCH$_3$ | 3-CH$_3$ | H | " | C$_2$H$_4$NHCOCH$_3$ | N(C$_6$H$_5$)C$_2$H$_4$ | Na |
| " | C$_2$H$_4$CN | 3-COCH$_3$ | " | " | H | NHC$_2$H$_4$ | " |
| " | C$_6$H$_5$ | 3-C$_6$H$_5$ | H | \multicolumn{2}{c}{—CH$_2$CH$_2$—O—CH$_2$CH$_2$—} | NHC$_2$H$_4$ | Na |
| " | " | H | H | \multicolumn{2}{c}{—CH$_2$CH$_2$—S—CH$_2$CH$_2$—} | NHC$_2$H$_4$ | Na |
| " | " | 3-CONHCH$_3$ | H | \multicolumn{2}{c}{—CH$_2$CH$_2$—SO$_2$—CH$_2$CH$_2$—} | NHC$_2$H$_4$ | Na |
| " | " | 3-CH$_3$ | H | \multicolumn{2}{c}{—CH$_2$CH$_2$—NH—CH$_2$CH$_2$—} | NHC$_2$H$_4$ | Na |
| " | " | 3-C$_2$H$_4$Cl | H | \multicolumn{2}{c}{—CH$_2$CH$_2$—N(COCH$_3$)—CH$_2$CH$_2$—} | NHC$_2$H$_4$ | Na |
| " | " | 3-Br | 3-CH$_3$ | H | C$_2$H$_4$SO$_2$NH$_2$ | NHC$_2$H$_4$ | Na |
| " | C$_6$H$_4$—p-OCH$_3$ | " | 2-OC$_6$H$_5$ | C$_2$H$_4$CN | C$_2$H$_4$N(COCH$_3$)$_2$ | NHC$_2$H$_4$ | " |
| " | " | 3-CONH$_2$ | 2-SCH$_3$ | C$_2$H$_4$OCOCH$_3$ | C$_2$H$_4$SO$_2$NHC$_2$H$_5$ | NHC$_2$H$_4$ | K |
| " | C$_6$H$_4$—p-Br | 3-CH$_2$CN | 3-SC$_6$H$_5$ | CONH$_2$ | C$_2$H$_4$SO$_2$NHC$_2$H$_5$ | NH—CH$_2$—CH(C$_6$H$_5$) | K |
| " | SO$_2$CH$_3$ | 3-CH$_2$CN | 3-NHCOOCH$_3$ | C$_2$H$_4$OH | C$_2$H$_4$OH | OC$_2$H$_4$ | Na |
| " | SO$_2$NHCH$_3$ | 3-C$_6$H$_5$ | 3-NHSO$_2$CH$_3$ | C$_2$H$_5$ | C$_2$H$_4$CN | NHC$_2$H$_4$OC$_2$H$_4$ | Na |
| " | SO$_2$C$_6$H$_5$ | H | 2-OCH$_3$, 5-NHCOCH$_3$ | C$_2$H$_4$OCOCH$_3$ | C$_2$H$_4$OCOCH$_3$ | NHC$_2$H$_4$ | NH$_4$ |
| " | " | 3-CH$_3$ | 3-NHCOCH$_2$Cl | C$_2$H$_4$OH | C$_6$H$_{13}$ | OC$_2$H$_4$ | K |
| " | COCH$_3$ | 3-C$_6$H$_5$ | 3-NHCOC$_2$H$_4$OH | H | C$_2$H$_4$OH | OC$_2$H$_4$ | K |
| 3,4 | H | | 2-CH$_3$, 3-Cl | H | CH$_2$C$_6$H$_5$ | NHC$_3$H$_6$ | K |
| " | H | H | 2-NHCON(C$_2$H$_5$)$_2$ | C$_2$H$_4$OH | C$_2$H$_4$CN | OC$_2$H$_4$ | NH$_4$ |
| " | CH$_3$ | H | 2-NHCON(C$_2$H$_5$) | C$_2$H$_4$OSO$_3$K | C$_2$H$_5$ | NHC$_2$H$_4$ | K |
| " | C$_2$H$_4$OCH$_3$ | H | 3-CH$_3$ | C$_2$H$_5$ | C$_2$H$_4$NHCOCH$_3$ | NHC$_2$H$_4$ | " |
| " | C$_6$H$_4$—p-CN | H | 3-NHCOCH$_3$ | " | C$_2$H$_4$CONH$_2$ | NHC$_2$H$_4$ | " |
| " | " | H | H | " | C$_2$H$_4$NHCOCH$_3$ | NHC$_2$H$_4$ | Na |

TABLE 2

(OCX'ZOSO$_3$M)$_n$ — structure with R$^1$, R$^2$, R$^8$, R$^4$

| Position | R | R$^1$ | R$^2$ | R$^8$ | R$^4$ | X'Z | M |
|---|---|---|---|---|---|---|---|
| 3 | H | H | 7-CH$_3$ | 2-CH$_3$ | C$_2$H$_4$OH | OC$_2$H$_4$ | Na |
| " | H | 4-CH$_3$ | 7-CH$_3$ | 2-CH$_3$ | C$_2$H$_4$OSO$_3$K | NHC$_2$H$_4$ | K |
| " | H | 4-C$_6$H$_5$ | H | H | C$_2$H$_4$OC$_6$H$_{11}$ | OC$_2$H$_4$ | Na |
| " | CH$_3$ | 4-CH$_3$ | 5-CH$_3$ | H | C$_4$H$_9$ | NHC$_2$H$_4$ | Na |
| " | C$_6$H$_4$—p-Br | H | 7-CH$_3$ | 2-CH$_3$ | C$_2$H$_4$NHCOCH$_3$ | " | " |
| " | " | 4-CH$_2$CN | 7-CH$_3$ | 2,2,4-(CH$_3$)$_3$ | " | N(C$_2$H$_5$)C$_2$H$_4$ | " |

TABLE 2-continued

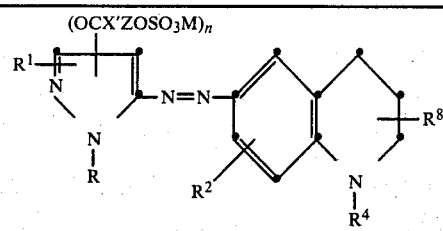

| Position | R | R¹ | R² | R⁸ | R⁴ | X'Z | M |
|---|---|---|---|---|---|---|---|
| " | SO₂C₆H₅ | 4-C₆H₅ | 8-CH₃ | H | C₂H₄Cl | OC₂H₄ | NH₄ |
| 4 | H | 3-CONH₂ | H | 2,2,4-(CH₃)₃ | C₂H₄OCH₃ | OC₂H₄OC₂H₄ | K |
| " | H | H | 7-NHCOCH₃ | " | C₂H₄Br | NHC₂H₄ | K |
| " | H | 3-CONH₂ | " | 5-CH₃ | CH₂CHOHCH₂OH | OC₂H₄ | K |
| " | H | H | 7-CH₃ | 2-CH₃ | CH₃ | NHC₂H₄ | K |
| " | CH₃ | H | 7-C₆H₁₁ | 3-OH | C₂H₄SO₂NH₂ | NHC₂H₄ | Na |
| " | " | 3-CH₃ | 7-OC₆H₅ | 3-CN | C₂H₄N(COCH₃)₂ | N(C₆H₅)C₂H₄ | " |
| " | SCN | 3-C₆H₅ | 7-SCH₃ | 3-OCOCH₃ | C₂H₄SO₂NHC₂H₅ | NHC₂H₄ | K |
| 3 | C₆H₅ | H | 7-CH₃ | 2-CH₃ | C₂H₅ | NHC₂H₄ | Na |
| 4 | C₂H₄OCH₃ | 3-CH₃ | 7-SC₆H₅ | 2-CH₃ | C₂H₄SO₂NHC₂H₅ | NH—CH₂—CH(C₆H₅) | K |
| " | C₂H₄CN | 3-COCH₃ | 7-NHCOOCH₃ | " | C₂H₄OH | OC₂H₄ | Na |
| " | C₆H₅ | 3-C₆H₅ | 7-NHSO₂CH₃ | 2-C₂H₅ | C₂H₄CN | NHC₂H₄OC₂H₄ | Na |
| " | " | H | 7-OCH₃ | 3-OCOCH₃ | C₂H₄OCOCH₃ | NHC₂H₄ | NH₄ |
| " | " | 3-CONHCH₃ | 7-NHCOCH₂Cl | 3-OH | C₆H₁₃ | OC₂H₄ | K |
| " | " | 3-CH₃ | 7-NHCOC₂H₄OH | 3-CONH₂ | C₂H₄OH | OC₂H₄ | K |
| " | " | 3-C₂H₄Cl | 7-CH₃, 5-Cl | 3-Cl | CH₂C₆H₅ | NHC₃H₆ | K |
| " | " | 3-Br | 7-NHCONHC₂H₅ | 3-OC₆H₅ | C₂H₄CN | OC₂H₄ | NH₄ |
| " | C₆H₄—p-OCH₃ | " | 7-NHCON(C₂H₅)₂ | 3-OC₆H₅ | C₂H₅ | NHC₂H₄ | K |
| " | " | 3-CONH₂ | 7-CH₃ | 3-SC₂H₅ | C₂H₄NHCOCH₃ | " | " |
| " | C₆H₄—p-Br | 3-CH₂CN | 7-NHCOCH₃ | 3-CONHC₂H₅ | C₂H₄CONH₂ | " | " |
| " | SO₂CH₃ | 3-CH₂CN | H | 3-OCH₃ | C₂H₄NHCOCH₃ | " | Na |

TABLE 3

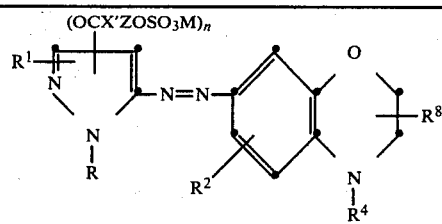

| Position | R | R¹ | R² | R⁸ | R⁴ | X'Z | M |
|---|---|---|---|---|---|---|---|
| 3 | H | H | 6-NHCOCH₃ | 3-CH₃ | C₂H₅ | NHC₂H₄ | Na |
| " | H | 4-CH₃ | 6-CH₃ | 3-CH₃ | C₂H₅ | OC₂H₄ | Na |
| " | H | 4-C₆H₅ | 6-Cl | " | C₂H₄OH | OC₂H₄ | K |
| " | CH₃ | 4-CH₃ | 6-Br | 2,3-di-CH₃ | C₂H₄SO₂NH₂ | " | NH₄ |
| " | C₆H₄—p-Br | H | 6-F | 3-CH₃ | " | NHC₂H₄ | K |
| " | " | 4-CH₂CN | H | 2-CH₂OH | CH(CH₃)₂ | " | " |
| " | SO₂C₆H₅ | 4-C₆H₅ | H | 2-CH₂OH | " | N(CH₃)C₂H₄ | " |
| 4 | H | 3-CONH₂ | 6-NHCOCH₃ | 2-CH₂Cl | C₂H₅ | NHC₃H₆ | Na |
| " | H | H | " | 3-CH(CH₃)₂ | C₂H₄OCH₃ | NHC₂H₄ | Na |
| " | H | 3-CONH₂ | 6-CH₃ | 3-CH₃ | " | " | Na |
| " | H | H | 6-C₆H₁₁ | 2-CH₂OC₆H₅ | C₂H₄SO₂NH₂ | NHC₂H₄ | Na |
| " | CH₃ | H | 6-OC₆H₅ | 2-CH₂OC₂H₅ | C₂H₄N(COCH₃)₂ | " | " |
| " | " | 3-CH₃ | 6-SCH₃ | 2-CH₂OCCH₃<br>‖<br>O | C₂H₄SO₂NHC₂H₅ | NHC₂H₄ | K |
| " | SCN | 3-C₆H₅ | 6-SC₆H₅ | 2-CH₂Cl | C₂H₄SO₂NHC₂H₅ | NH—CH₂—CH(C₆H₅) | K |
| " | C₂H₄OCH₃ | 3-CH₃ | 6-NHCOOCH₃ | 2-CH₂OH | C₂H₄OH | OC₂H₄ | Na |
| " | C₂H₄CN | 3-COCH₃ | 6-NHSO₂CH₃ | " | C₂H₄CN | NHC₂H₄OC₂H₄ | Na |
| " | C₆H₅ | 3-C₆H₅ | 8-OCH₃ | 2-CH₂OCCH₃<br>‖<br>O | C₂H₄OCOCH₃ | NHC₂H₄ | NH₄ |
| " | " | H | 5-NHCOCH₃ | " | C₆H₁₃ | OC₂H₄ | K |
| " | " | 3-CONHCH₃ | 6-NHCOCH₂Cl | " | C₂H₄OH | OC₂H₄ | K |
| " | " | 3-CH₃ | 6-NHCOC₂H₄OH | 3-C₂H₅ | CH₂C₆H₅ | NHC₃H₆ | K |
| " | " | 3-C₂H₄Cl | 8-CH₃, 5-Cl | " | C₂H₄CN | OC₂H₄ | NH₄ |
| " | " | 3-Br | 6-NHCONHC₂H₅ | 2-CH₂OC₆H₅ | C₂H₅ | NHC₂H₄ | K |
| " | C₆H₄—p-OCH₃ | " | 6-NHCON(C₂H₅)₂ | 2-CH₂OC₆H₅ | C₂H₄NHCOCH₃ | " | " |
| " | " | 3-CONH₂ | 6-OC₆H₅ | H | C₂H₄CONH₂ | " | " |
| " | C₆H₄—p-Br | 3-CH₂CN | 6-NHCOCH₃ | " | C₂H₄NHCOCH₃ | " | " |
| " | SO₂CH₃ | 3-CH₂CN | H | " | C₂H₄NHCOCH₃ | N(C₆H₅)C₂H₄ | Na |

TABLE 4

Structure with (OCX'ZOSO₃M)ₙ, R¹, R, R⁹, R², R⁴ substituents on pyrazole-azo-indole system.

| Position | R | R¹ | R⁹ | R² | R⁴ | X'Z | M |
|---|---|---|---|---|---|---|---|
| 3 | H | H | C₆H₅ | H | CH₃ | NHC₂H₄ | Na |
| " | H | 4-CH₃ | CH₃ | 6-CH₃ | CH₃ | " | " |
| " | H | 4-C₆H₅ | " | " | C₆H₅ | " | " |
| " | CH₃ | 4-CH₃ | " | H | C₂H₅ | " | " |
| " | C₆H₄—p-Br | H | C₆H₅ | H | H | " | " |
| " | " | 4-CH₂CN | " | " | CH₃ | " | " |
| " | SO₂C₆H₅ | 4-C₆H₅ | CH₃ | " | CH₃ | N(CH₃)C₂H₄ | " |
| 4 | H | 3-CONH₂ | " | 5-OC₂H₅ | " | NHC₃H₆ | " |
| " | H | H | CH₃ | " | H | NHC₂H₄ | " |
| " | H | 3-CONH₂ | C₆H₄—p-Br | H | H | " | " |
| " | H | H | C₆H₅ | " | C₂H₄CONH₂ | " | K |
| " | CH₃ | H | C₆H₄—p-OCH₃ | " | C₂H₄CN | N(C₆H₅)C₂H₄ | K |
| " | " | 3-CH₃ | " | 5-C₆H₁₁ | C₂H₄SO₂NH₂ | NHC₂H₄ | " |
| " | SCN | 3-C₆H₅ | C₂H₄CN | 6-OC₆H₅ | C₂H₄N(COCH₃)₂ | " | " |
| " | C₂H₄OCH₃ | 3-CH₃ | C₂H₄OCOCH₃ | 6-SCH₃ | C₂H₄SO₂NHC₂H₅ | NHC₂H₄ | K |
| " | C₂H₄CN | 3-COCH₃ | CH₃ | 6-SC₆H₅ | C₂H₄SO₂NHC₂H₅ | NH—CH₂—CH(C₆H₅) | K |
| " | C₆H₅ | 3-C₆H₅ | " | 6-NHCOOCH₃ | C₂H₄OCH₃ | OC₂H₄ | Na |
| " | " | H | C₃H₇ | 6-NHSO₂CH₃ | C₂H₄CN | NHC₂H₄OC₂H₄ | Na |
| " | " | 3-CONHCH₃ | CH₃ | 6-OCH₃, 5-NHCOCH₃ | C₂H₄OCOCH₃ | NHC₂H₄ | NH₄ |
| " | " | 3-CH₃ | C₂H₅ | 6-NHCOCH₂Cl | C₆H₁₃ | OC₂H₄ | K |
| " | " | 3-C₂H₄Cl | " | 6-NHCOC₂H₄OH | C₂H₄OH | OC₂H₄ | K |
| " | " | 3-Br | " | " | CH₂C₆H₅ | NHC₃H₆ | K |
| " | C₆H₄—p-OCH₃ | " | C₂H₅ | 6-NHCONHC₂H₅ | C₂H₄CN | OC₂H₄ | NH₄ |
| " | " | 3-CONH₂ | C₆H₄—p-OCH₃ | 6-NHCON(C₂H₅)₂ | C₂H₅ | NHC₂H₄ | K |
| " | C₆H₄—p-Br | 3-CH₂CN | C₂H₅ | 6-CH₃ | C₂H₄NHCOCH₃ | " | " |
| " | SO₂CH₃ | 3-CH₂CN | C₂H₅ | 6-NHCOCH₃ | C₂H₄CONH₂ | " | " |
| " | SO₂NHCH₃ | 3-C₆H₅ | CH₃ | H | C₂H₄NHCOCH₃ | " | Na |
| " | SO₂C₆H₅ | H | " | " | C₂H₄Cl | " | " |
| " | " | 3-CH₃ | —C₆H₄—p-CH₃ | 6-OH | " | " | " |

TABLE 5

Structure with (OCX'ZOSO₃M)ₙ, R¹, R⁹, R¹⁰ substituents on pyrazole-azo-thiazole system.

| Position | R | R¹ | R⁹ | R¹⁰ | X'Z | M |
|---|---|---|---|---|---|---|
| 3 | H | H | C₆H₅ | H | NHC₂H₄ | Na |
| " | H | 4-CH₃ | CH₃ | " | OC₂H₄OC₂H₄ | Na |
| " | H | 4-C₆H₅ | CH₃ | H | OC₂H₄ | Na |
| " | CH₃ | 4-CH₃ | CH₃ | —C₆H₅ | NHC₂H₄ | Na |
| " | C₆H₄—p-Br | H | CH₃ | —C₆H₅ | NHC₃H₆ | Na |
| " | " | 4-CH₂CN | C₆H₅ | —CH₃ | NHC₂H₄ | Na |
| " | SO₂C₆H₅ | 4-C₆H₅ | —C₆H₅ | " | " | NH₄ |
| 4 | H | 3-CONH₂ | " | " | N(C₂H₅)C₂H₄ | " |
| " | H | H | CH₃ | H | NHC₂H₄ | K |
| " | H | 3-CONH₂ | " | H | NH—(CH₂)₅ | K |
| " | H | H | C₆H₄—p-Br | " | OC₂H₄ | K |
| " | CH₃ | H | C₆H₄—p-OCH₃ | " | OC₂H₄OC₂H₄ | K |
| " | " | 3-CH₃ | " | Br | NHC₂H₄ | K |
| " | SCN | 3-C₆H₅ | C₂H₄CN | Br | N(C₆H₅)C₂H₄ | K |
| " | C₂H₄OCH₃ | 3-CH₃ | C₂H₄OCOCH₃ | Br | NHC₂H₄ | K |
| " | C₂H₄CN | 3-COCH₃ | CH₃ | C₂H₅ | NH—CH₂—CH(C₆H₅) | K |
| " | C₆H₅ | 3-C₆H₅ | " | C₂H₅ | OC₂H₄ | K |
| " | " | H | C₃H₇ | C₆H₅ | NHC₂H₄OC₂H₄ | K |
| " | " | 3-CONHCH₃ | CH₃ | " | NHC₂H₄ | K |
| " | " | 3-CH₃ | C₂H₅ | —C₆H₄—p-CH₃ | OC₂H₄ | K |
| " | " | 3-C₂H₄Cl | " | H | OC₂H₄ | K |
| " | " | 3-Br | " | —CONHC₂H₅ | NHC₃H₆ | K |
| " | C₆H₄—p-OCH₃ | " | C₂H₅ | CH₃ | OC₂H₄ | K |
| " | " | 3-CONH₂ | C₆H₄—p-OCH₃ | C₂H₅ | NHC₂H₄ | K |

TABLE 5-continued

Structure: R¹-[pyrazole ring with (OCX'ZOSO₃M)ₙ and NR group]-N=N-[ring with R⁹]-N-[ring with S]-R¹⁰

| Position | R | R¹ | R⁹ | R¹⁰ | X'Z | M |
|---|---|---|---|---|---|---|
| " | C₆H₄—p-Br | 3-CH₂CN | —C₂H₅ | SCN | " | K |
| " | SO₂CH₃ | 3-CH₂CN | C₂H₅ | —CONH₂ | " | K |
| " | SO₂NHCH₃ | 3-C₆H₅ | —CH₃ | —CH(CH₃)₂ | " | K |
| " | SO₂C₆H₅ | H | " | C₆H₅ | " | K |
| " | " | 3-CH₃ | C₆H₄—p-CH₃ | C₂H₅ | NHC₂H₄OCH₂ | K |

TABLE 6

Structure: R¹-[pyrazole ring with (OCX'ZOSO₃M)ₙ and NR group]-N=N-[ring with O, NR⁴ and R¹¹]

| Position | R | R¹ | R⁴ | R¹¹ | X'Z | M |
|---|---|---|---|---|---|---|
| 3 | H | H | H | CH₃ | NHC₂H₄ | K |
| " | H | 4-CH₃ | H | C₆H₄—p-OCH₃ | " | " |
| " | H | 4-C₆H₅ | H | CF₃ | " | " |
| " | CH₃ | 4-CH₃ | H | —COOC₂H₅ | " | " |
| " | C₆H₄—p-Br | H | H | —C(=O)—NHC₂H₄OSO₃Na | " | Na |
| " | " | 4-CH₂CN | H | C₆H₅ | " | K |
| " | SO₂C₆H₅ | 4-C₆H₅ | C₆H₅ | C₆H₄—p-Br | " | " |
| 4 | H | 3-CONH₂ | " | C(CH₃)₃ | " | " |
| " | H | H | " | C₆H₁₁ | " | Na |
| " | H | 3-CONH₂ | " | C₆H₅ | " | Na |
| " | H | H | C₆H₅SO₂ | CH₃ | N(CH₃)C₂H₄ | Na |
| " | CH₃ | H | C₂H₅SO₂ | " | NHC₂H₄ | K |
| " | " | 3-CH₃ | CH₃C(=O)— | " | N(C₆H₅)C₂H₄ | K |
| " | SCN | 3-C₆H₅ | C₆H₅C(=O)— | CH₃ | NHC₂H₄ | K |
| " | C₂H₄OCH₃ | 3-CH₃ | CH₃ | CONH₂ | NH—CH₂—CH(C₆H₅) | K |
| " | C₂H₄CN | 3-COCH₃ | C₂H₄OH | C₂H₅ | OC₂H₄ | K |
| " | C₆H₅ | 3-C₆H₅ | C₂H₄CN | " | NHC₂H₄OC₂H₄ | K |
| " | " | H | C₂H₄OCOCH₃ | " | NHC₂H₄ | K |
| " | " | 3-CONHCH₃ | C₆H₁₁ | CF₃ | OC₂H₄ | K |
| " | " | 3-CH₃ | C₂H₄OH | C₆H₄—p-Cl | OC₂H₄ | K |
| " | " | 3-C₂H₄Cl | CH₂C₆H₅ | CONHC₂H₅ | NHC₃H₆ | K |
| " | " | 3-Br | C₂H₄CN | CH(CH₃)₂ | OC₂H₄ | K |
| " | C₆H₄—p-OCH₃ | " | C₂H₅ | " | NHC₂H₄ | K |
| " | " | 3-CONH₂ | C₂H₄NHCOCH₃ | C₂H₅ | " | K |
| " | C₆H₄—p-Br | 3-CH₂CN | C₂H₄CONH₂ | CH₃ | " | K |
| " | SO₂CH₃ | 3-CH₂CN | C₂H₄NHCOCH₃ | C₂H₅ | " | K |
| " | SO₂NHCH₃ | 3-C₆H₅ | " | C₆H₅ | " | K |

TABLE 7

Structure: R¹-[pyrazole ring with (OCX'ZOSO₃M)ₙ and NR group]-N=N-CH(Q-R¹²)(Q'-R¹³)

| Position | R | R¹ | Q | Q' | R¹² | R¹³ | X'Z | M |
|---|---|---|---|---|---|---|---|---|
| 3 | H | H | CO | CO | C₆H₅ | C₆H₅ | NHC₂H₄ | Na |

TABLE 7-continued $$\begin{array}{c} (OCX'ZOSO_3M)_n \\ R^1 \underset{N}{\overset{|}{\underset{|}{\bigg|}}} \phantom{xx} N=N-CH \overset{Q-R^{12}}{\underset{Q'-R^{13}}{\diagdown}} \\ \underset{R}{\overset{|}{N}} \end{array}$$

| Position | R | R¹ | Q | Q' | R¹² | R¹³ | X'Z | M |
|---|---|---|---|---|---|---|---|---|
| " | H | 4-CH₃ | CO | CO | CH₃ | CH₂OH | " | Na |
| " | H | 4-C₆H₅ | CN | CO | — | NHCO₂C₂H₅ | OC₂H₄ | Na |
| " | CH₃ | 4-CH₃ | CN | CO | — | CH₃ | NHC₂H₄ | Na |
| " | C₆H₄—p-Br | H | CO | SO₂ | NH₂ | OC₆H₅ | " | " |
| " | " | 4-CH₂CN | CO | SO₂ | CH₃ | OCH₃ | " | " |
| " | SO₂C₆H₅ | 4-C₆H₅ | CN | SO₂ | — | C₆H₅ | " | " |
| 4 | H | 3-CONH₂ | CO | CO | —CH₂C(CH₃)₂CH₂— | | " | K |
| " | H | H | CO | CO | 1,2-C₆H₄— | | " | K |
| " | H | 3-CONH₂ | CO | CO | C₂H₅ | OC₂H₅ | " | K |
| " | H | H | CO | CO | CF₃ | H | " | K |
| " | CH₃ | H | CO | CO | OCH₃ | H | " | K |
| " | " | 3-CH₃ | CO | CO | CH₂Cl | H | " | K |
| " | SCN | 3-C₆H₅ | CO | CO | " | CH₃ | " | K |
| " | C₂H₄OCH₃ | 3-CH₃ | CO | CO | NHC₂H₅ | NH₂ | N(CH₃)C₂H₄ | K |
| " | C₂H₄CN | 3-COCH₃ | CO | CO | NHC₂H₅ | NH₂ | N(C₆H₅)C₂H₄ | K |
| " | C₆H₅ | 3-C₆H₅ | CO | CO | OC₂H₅ | C₂H₅ | NHC₂H₄ | K |
| " | " | H | CO | CO | OCH₂—C₆H₅ | " | NHC₂H₄ | K |
| " | " | 3-CONHCH₃ | CO | CO | OC₆H₁₁ | OCH₃ | NHC₂H₄ | K |
| " | " | 3-CH₃ | CO | CO | C₆H₅ | OCH₃ | NHC₂H₄ | K |
| " | " | 3-C₂H₄Cl | CO | CO | NHCOC₂H₅ | NHCO₂C₂H₅ | NHC₂H₄ | K |
| " | " | 3-Br | CO | CO | NHSO₂C₂H₅ | NHCO₂C₂H₅ | NHC₂H₄ | K |
| " | C₆H₄—p-OCH₃ | " | CO | CO | NHCOC₆H₅ | NHCO₂C₂H₅ | NHC₂H₄ | K |
| " | " | 3-CONH₂ | CO | CO | OC₂H₅ | NHCO₂C₂H₅ | NHC₂H₄ | K |

TABLE 8

$$\begin{array}{c} (OCX'ZOSO_3M)_n \phantom{xxx} (OH)_e \\ R^1 \underset{N}{\overset{|}{\underset{|}{\bigg|}}} \phantom{xx} N=N \underset{R^2}{\bigg\langle} \\ \underset{R}{\overset{|}{N}} \end{array}$$

| Position | R | R¹ | OH Position | R² | X'Z | M |
|---|---|---|---|---|---|---|
| 3 | H | H | 2 | 5-CH₃ | NHC₂H₄ | Na |
| " | H | 4-CH₃ | 2 | 5-CH₃ | OC₂H₄ | Na |
| " | H | 4-C₆H₅ | 2 | 5-OCH₃ | NHC₂H₄ | K |
| " | CH₃ | 4-CH₃ | 2 | 5-Cl | " | Na |
| " | C₆H₄—p-Br | H | 2 | 5-Cl | " | Na |
| " | " | 4-CH₂CN | 4 | 3-OCH₃ | " | K |
| " | SO₂C₆H₅ | 4-C₆H₅ | 4 | 3-OCH₃ | " | K |
| 4 | H | 3-CONH₂ | 3,4 | H | " | Na |
| " | H | H | 4 | 2-NH—C₆H₅ | " | Na |
| " | H | 3-CONH₂ | 2 | 5-NHCOCH₃ | " | Na |
| " | H | H | 3,4 | H | N(CH₃)C₂H₄ | K |
| " | CH₃ | H | 2 | 5-C—NH—<br>‖<br>O<br>—C₂H₄OSO₃K | NHC₂H₄ | K |
| " | " | 3-CH₃ | 2 | 5-C₆H₁₁ | NHC₂H₄ | K |
| " | SCN | 3-C₆H₅ | 2 | 5-OC₆H₅ | N(C₆H₅)C₂H₄ | " |
| " | C₂H₄OCH₃ | 3-CH₃ | 2 | 5-SCH₃ | NHC₂H₄ | K |
| " | C₂H₄CN | 3-COCH₃ | 2 | 5-SC₆H₅ | NH—CH₂—CH(C₆H₅) | Na |
| " | C₆H₅ | 3-C₆H₅ | 2 | 5-NHCOOCH₃ | OC₂H₄ | Na |
| " | " | H | 2 | 5-NHSO₂CH₃ | NHC₂H₄OC₂H₄ | Na |
| " | " | 3-CONHCH₃ | 2 | 5-NHCOCH₃ | NHC₂H₄ | NH₄ |
| " | " | 3-CH₃ | 2 | 5-NHCOCH₂Cl | OC₂H₄ | K |
| " | " | 3-C₂H₄Cl | 2 | 5-NHCOC₂H₄OH | OC₂H₄ | K |
| " | " | 3-Br | 2 | 5-Cl | NHC₃H₆ | K |
| " | C₆H₄—p-OCH₃ | " | 2 | 5-NHCONHC₂H₅ | OC₂H₄ | NH₄ |
| " | " | 3-CONH₂ | 2 | 5-NHCON(C₂H₅)₂ | NHC₂H₄ | K |
| " | C₆H₄—p-Br | 3-CH₂CN | 2 | 5-CH₃ | " | " |
| " | SO₂CH₃ | 3-CH₂CN | 2 | 5-NHCOCH₃ | " | " |
| " | SO₂NHCH₃ | 3-C₆H₅ | 4 | H | " | Na |

TABLE 9

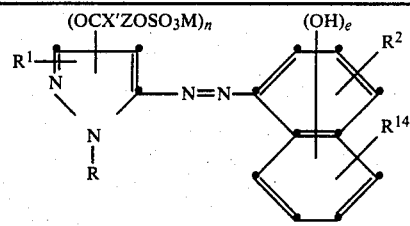

| Position | R | R¹ | OH Position | R² | R¹⁴ | X'Z | M |
|---|---|---|---|---|---|---|---|
| 3 | H | H | 2 | H | 6-SO₂N(CH₃)₂ | NHC₂H₄ | Na |
| " | H | 4-CH₃ | 2 | H | " | " | " |
| " | H | 4-C₆H₅ | 2 | 3-CONH₂ | H | " | Na |
| " | CH₃ | 4-CH₃ | 4 | H | H | N(CH₃)C₂H₄ | " |
| " | C₆H₄—p-Br | H | 4 | H | H | OC₂H₄ | K |
| " | " | 4-CH₂CN | 2,6 | H | H | OC₂H₄OC₂H₄ | K |
| " | SO₂C₆H₅ | 4-C₆H₅ | 2 | H | H | OC₂H₄ | K |
| 4 | H | 3-CONH₂ | " | H | 6-SO₂NHCH₃ | OC₂H₄OC₂H₄ | K |
| " | H | H | 2 | 3-CONH₂ | H | NHC₂H₄ | Na |
| " | H | 3-CONH₂ | 2 | 3-CONHC₆H₅ | H | NH—CH(C₂H₅)CH₂ | Na |
| " | H | H | 2 | 3-CONH—C₆H₄—p—OC₂H₄OH | H | OC₂H₄ | NH₄ |
| " | CH₃ | H | 4 | H | H | NHC₂H₄ | Na |
| " | " | 3-CH₃ | 4 | H | H | NHC₂H₄ | Na |
| " | SCN | 3-C₆H₅ | 4 | H | H | " | " |
| " | C₂H₄OCH₃ | 3-CH₃ | 2 | H | H | NHC₂H₄ | K |
| " | C₂H₄CN | 3-COCH₃ | 2 | " | " | NH—CH₂—CH(C₆H₅) | K |
| " | C₆H₅ | 3-C₆H₅ | 2 | 3-CO₂CH₃ | " | OC₂H₄ | Na |
| " | " | H | 2 | " | " | NHC₂H₄OC₂H₄ | Na |
| " | " | 3-CONHCH₃ | 2,4 | H | H | NHC₂H₄ | NH₄ |
| " | " | 3-CH₃ | 2 | 3-COCH₂Cl | " | OC₂H₄ | K |
| " | " | 3-C₂H₄Cl | 4 | H | " | OC₂H₄ | K |
| " | " | 3-Br | " | H | H | NHC₃H₆ | K |
| " | C₆H₄—p-OCH₃ | " | 4 | H | " | OC₂H₄ | NH₄ |
| " | " | 3-CONH₂ | 4 | H | " | NHC₂H₄ | K |
| " | C₆H₄—p-Br | 3-CH₂CN | 4 | H | " | " | " |
| " | SO₂CH₃ | 3-CH₂CN | 2 | 3-CONHC₆H₅ | " | " | " |
| " | SO₂NHCH₃ | 3-C₆H₅ | 2 | H | " | N(C₆H₅)C₂H₄ | " |

TABLE 10

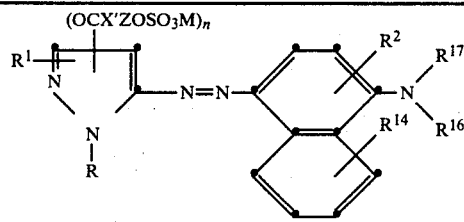

| Position | R | R¹ | R¹⁶ | R¹⁷ | R² | R¹⁴ | X'Z | M |
|---|---|---|---|---|---|---|---|---|
| 3 | H | H | C₆H₁₁ | H | H | H | NHC₂H₄ | Na |
| " | H | 4-CH₃ | C₂H₄CONH₂ | H | H | " | " | " |
| " | H | 4-C₆H₅ | C₂H₄SO₂CH=CH₂ | H | H | 8-OH | " | Na |
| " | CH₃ | 4-CH₃ | C₂H₄NHSO₂CH₃ | H | H | H | N(CH₃)C₂H₄ | " |
| " | C₆H₄—p-Br | H | C₂H₄NH—C(O)—CH₃ | H | 3-OCH₃ | 8-OH | OC₂H₄ | K |
| " | " | 4-CH₂CN | C₂H₄OC₂H₄OCH₃ | H | H | H | OC₂H₄OC₂H₄ | K |
| " | SO₂C₆H₅ | 4-C₆H₅ | CH(CH₃)C₂H₅ | H | H | H | OC₂H₄ | K |
| 4 | H | 3-CONH₂ | CH(CH₃)CH₂CH(CH₃)CH₃ | CH₃ | H | H | OC₂H₄OC₂H₄ | K |
| " | H | H | —C₆H₅ | H | 3-OCH₃ | H | NHC₂H₄ | Na |
| " | H | 3-CONH₂ | C₂H₅ | C₂H₄OH | " | H | NH—CH(C₂H₅)CH₂ | Na |
| " | H | H | CH₂CH(OH)CH₂OH | " | " | H | OC₂H₄ | NH₄ |
| " | CH₃ | H | C₂H₄SO₂NH₂ | H | " | H | NHC₂H₄ | Na |
| " | " | 3-CH₃ | (CH₂)₃NHCOCH₃ | H | H | H | NHC₂H₄ | Na |
| " | SCN | 3-C₆H₅ | C₂H₄OC₂H₄OH | H | H | H | " | " |
| " | C₂H₄OCH₃ | 3-CH₃ | C₃H₆OCH₃ | H | " | H | NHC₂H₄ | K |
| " | C₂H₄CN | 3-COCH₃ | CH₂C₆H₅ | CH₂C₆H₅ | " | " | NH—CH₂—CH(C₆H₅) | K |
| " | C₆H₅ | 3-C₆H₅ | —C₆H₁₁ | H | H | " | OC₂H₄ | Na |
| " | " | H | C₂H₄CONH₂ | H | " | " | NHC₂H₄OC₂H₄ | Na |
| " | " | 3-CONHCH₃ | C₂H₄SO₂CH=CH₂ | H | H | 8-OCH₃ | NHC₂H₄ | NH₄ |
| " | " | 3-CH₃ | CH₂—[ring]—CH₂OH | H | 3-OC₂H₅ | 8-OC₂H₅ | OC₂H₄ | K |

TABLE 10-continued

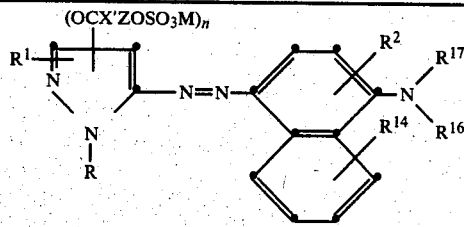

| Position | R | R¹ | R¹⁶ | R¹⁷ | R² | R¹⁴ | X'Z | M |
|---|---|---|---|---|---|---|---|---|
| " | " | 3-C₂H₄Cl | O‖C₂H₄NH—C—CH₃ | H | H | " | OC₂H₄ | K |
| " | " | 3-Br | C₂H₄OC₂H₄OCH₃ | H | H | H | NHC₃H₆ | K |
| " | C₆H₄—p-OCH₃ | " | CH(CH₃)C₂H₅ | H | H | " | OC₂H₄ | NH₄ |
| " | " | 3-CONH₂ | CH(CH₃)CH₂CH(CH₃)CH₃ | H | H | " | NHC₂H₄ | K |
| " | C₆H₄—p-Br | 3-CH₂CN | C₆H₅ | H | 3-C₂H₅ | " | " | " |
| " | SO₂CH₃ | 3-CH₂CN | C₂H₅ | " | H | " | " | " |
| " | SO₂NHCH₃ | 3-C₆H₅ | CH₂CH(OH)CH₂OH | " | H | " | N(C₆H₅)C₂H₄ | " |

The invention has been described in detail with particular reference to certain preferred embodiments thereof, but it will be understood that variations and modifications can be effected within the spirit and scope of the invention.

We claim:

1. A dye of the formula:

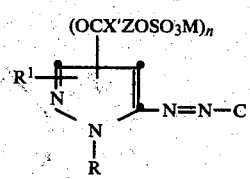

wherein $R^1$ is selected from hydrogen, alkyl, aryl, alkylthio, carbamoyl, alkylcarbamoyl, alkanoyl, cyanoalkyl, and halogen; R is selected from hydrogen, alkyl, aryl, alkanoyl, alkylsulfonyl, arylsulfonyl, alkyl sulfamoyl, arylsulfamoyl, alkyl substituted with alkoxy, cyano, or halogen, and aryl substituted with alkoxy, halogen or cyano; and C is selected from

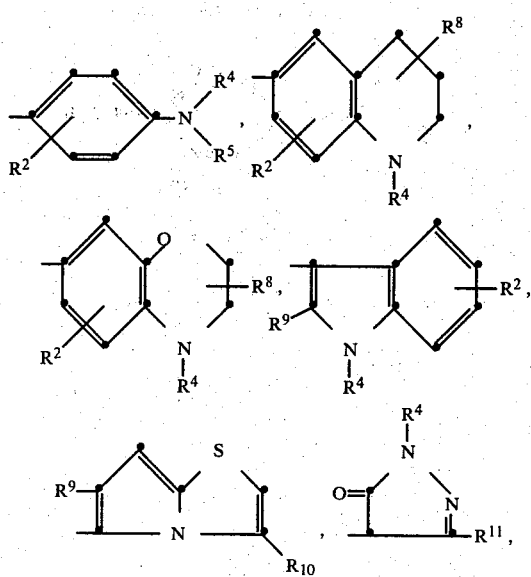

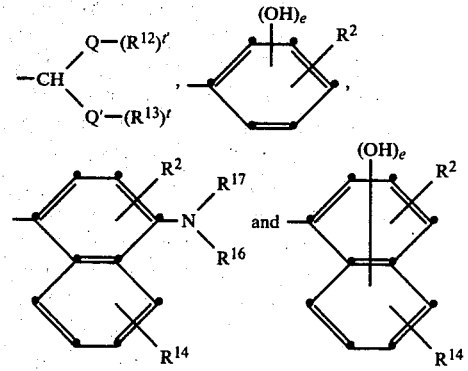

wherein $R^2$ and $R^{14}$ each represents up to three groups selected from hydrogen, fluorine, chlorine, bromine, alkyl, cycloalkyl, alkoxy, phenoxy, alkylthio, arylthio, and radicals having the formula —NH—X—R³ in which X is —CO—, —COO—, or —SO₂— and $R^3$ is selected from alkyl and alkyl substituted with halogen, hydroxy, phenoxy, aryl, cyano, cycloalkyl, alkylsulfonyl, alkylthio, alkanoyloxy, and alkoxy, and when X is —CO—, $R^3$ also is selected from hydrogen, amino, alkylamino, dialkylamino, arylamino, aryl, and furyl;

$R^4$ and $R^5$ are each selected from hydrogen, alkyl, aryl, cycloalkyl, and alkyl substituted with halogen, CN, OH, alkoxy, aryloxy, alkoxyalkoxy, alkanoyl, alkanolyloxy, carbamoyl, alkylcarbamoyl, sulfamoyl, alkylsulfamoyl, alkoxyalkanoyloxy, and cycloalkyl, and $R^4$ and $R^5$ together represent a single, combined group —CH₂CH₂CH₂CH₂CH₂—, —CH₂CH₂OCH₂CH₂—, —CH₂CH₂—S—CH₂CH₂—, or —CH₂CH₂—SO₂—CH₂CH₂—;

$R^8$ represents one or two groups each selected from hydrogen, alkyl and alkyl substituted with —CN, alkoxy, alkoxycarbonyl, alkoxycarbonyloxy, phenyl, cyclohexoxy, —OH, —Cl and Br;

$R^9$, $R^{10}$ and $R^{11}$ are each selected from hydrogen, alkyl, phenyl, or phenyl substituted with 1-3 groups selected from Cl, Br, alkyl or alkoxy, alkylthio, benzylthio, cyclohexylthio and phenylthio;

Q and Q' are each selected from —CO—, —SO$_2$—, or —CN; R$^{12}$ and R$^{13}$ are each selected from alkyl, hydroxyalkyl, alkoxy, alkoxycarbonylamino, trifluoromethyl, phenyl or phenyl substituted with 1-3 groups selected from Cl, Br, alkyl or alkoxy, alkoxycarbonylalkyl, cyanoalkyl, amino, haloalkyl, alkylamino, alkylthio, benzylthio, cyclohexylthio and phenylthio; and R$^{12}$ and R$^{13}$ together comprise —CH$_2$C(CH$_3$)$_2$CH$_2$—, or 1,2-C$_6$H$_4$— connecting Q and Q'; R$^{16}$ and R$^{17}$ are selected from hydrogen, cycloalkyl, aryl, alkyl, and alkyl substituted with alkoxy, hydroxy, alkoxyalkoxy, hydroxyalkoxy, carbamoyl, sulfamoyl, alkanoylamino, or alkenylsulfonyl, and aryl substituted with hydroxyalkyl; e is 1 or 2; t and t' are each 1 or zero; X' is O, NH, N(alkyl)—, or N(aryl)—; Z is selected from straight- or branched-chain alkylene, and such alkylene substituted with phenyl, halogen, OSO$_3$M, alkoxy or aryloxy groups, —CH$_2$(CH$_2$)$_m$V—CH$_2$(CH$_2$)$_p$—, where m is 1, 2 or 3, p is 0, 1, 2 or 3, and V is O, S, SO$_2$, —SO$_2$NH—, —SO$_2$N(alkyl)—, —SO$_2$N(aryl), —N(SO$_2$ aryl)—, —NH, —NHCO—, —NHCONH, —N(SO$_2$ alkyl), or —CON(alkyl); M is H, Na, K or NH$_4$; n is 1 or 2; and wherein each of the above alkyl and alkoxy groups contain from 0 to three of the following: hydroxy; halogen; cyano; succinimido; glutarimido; phthalimido; 2-pyrrolidono; cyclohexyl; phenyl or phenyl substituted with alkyl, alkoxy, halogen, alkanoylamino, cyano or alkoxycarbonyl; alkanoylamino; sulfamoyl; alkyl-sulfamoyl; vinylsulfonyl; acrylamido; phthalimidinyl; benzoylsulfonicimidyl; alkylsulfonamido; phenylsulfonamido; alkoxycarbonylamino; alkylcarbamoyloxy; alkoxycarbonyl; alkoxybonyloxy;

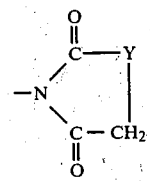

wherein Y is —NH—, —NH-alkyl—, —O—, —S—, or —CH$_2$O—; —S—R$^6$, wherein R$^6$ is alkyl, phenyl, phenyl substituted with halogen, alkyl, alkoxy, alkanoylamino, cyano, or alkoxycarbonyl, pyridyl, pyrimidinyl, benzoxazolyl, benzimidazolyl, benzothiazolyl, or

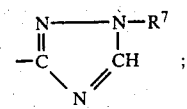

—SO$_2$R$^3$; —COOR$^3$; —OXR$^3$; —NH—X—R$^3$; —X—R$^3$; —SO$_2$NR$^7$R$^7$; wherein R$^3$ and X are as defined above and each R$^7$ is selected from H and R$^3$; alkoxy; alkoxy substituted with hydroxy, cyano, alkanoyloxy, or alkoxy; phenoxy; or phenoxy substituted with one or more of alkyl, alkoxy or halogen.

2. The dye according to claim 1 of the formula

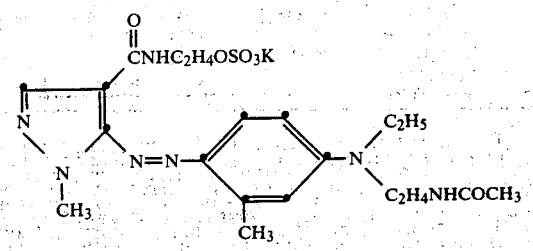

3. The dye according to claim 1 of the formula

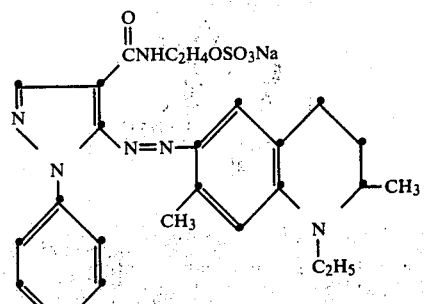

4. The dye according to claim 1 of the formula

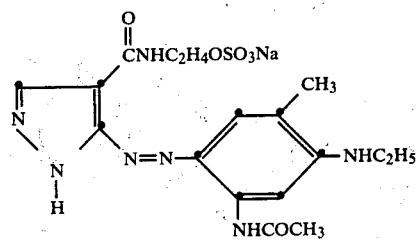

* * * * *